May 5, 1931.  W. C. SEITZ  1,803,776

CLUTCH

Filed July 17, 1929    4 Sheets-Sheet 1

Inventor
W. C. Seitz.
By Lacey & Lacey, Attorneys

May 5, 1931.                 W. C. SEITZ                    1,803,776
                              CLUTCH
                       Filed July 17, 1929           4 Sheets-Sheet 2

Inventor
W. C. Seitz.
By Lacey & Lacey, Attorneys

May 5, 1931. W. C. SEITZ 1,803,776
CLUTCH
Filed July 17, 1929 4 Sheets-Sheet 4

Inventor
W. C. Seitz.
By Lacey & Lacey,
Attorneys

Patented May 5, 1931

1,803,776

UNITED STATES PATENT OFFICE

WILLIAM C. SEITZ, OF AMSTERDAM, NEW YORK

CLUTCH

Application filed July 17, 1929. Serial No. 379,005.

The present invention relates to improvements in clutches designed primarily for use in connection with heavy duty machinery but which may be employed on automobiles and in other fields. The invention is illustrated in the accompanying drawing and will be hereinafter fully set forth and defined.

In the accompanying drawings:

Figure 6 is a sectional view on the line 6—6 of Figure 1.

Figure 1:
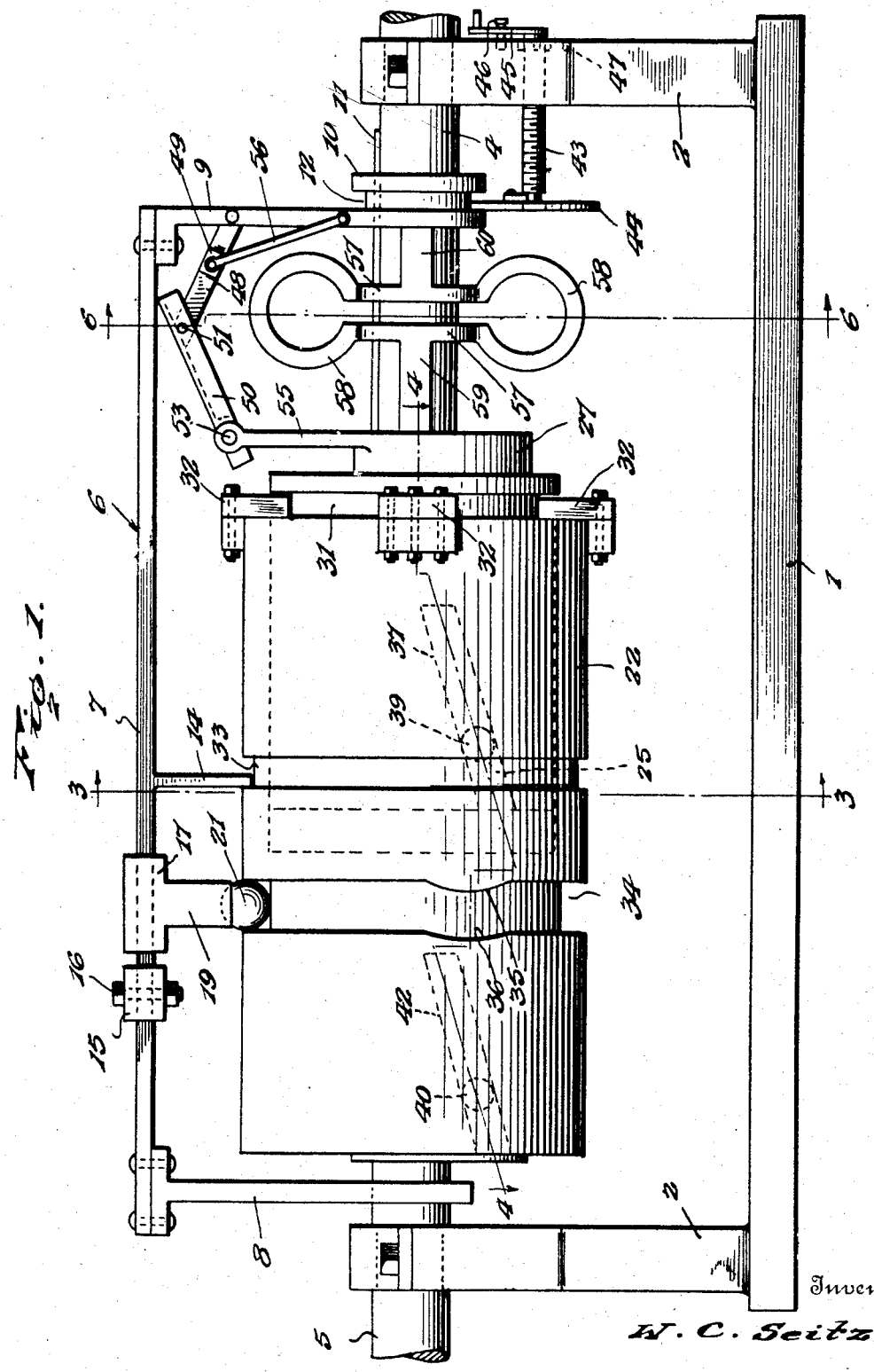
Figure 1 is a side elevation.
Figure 2:
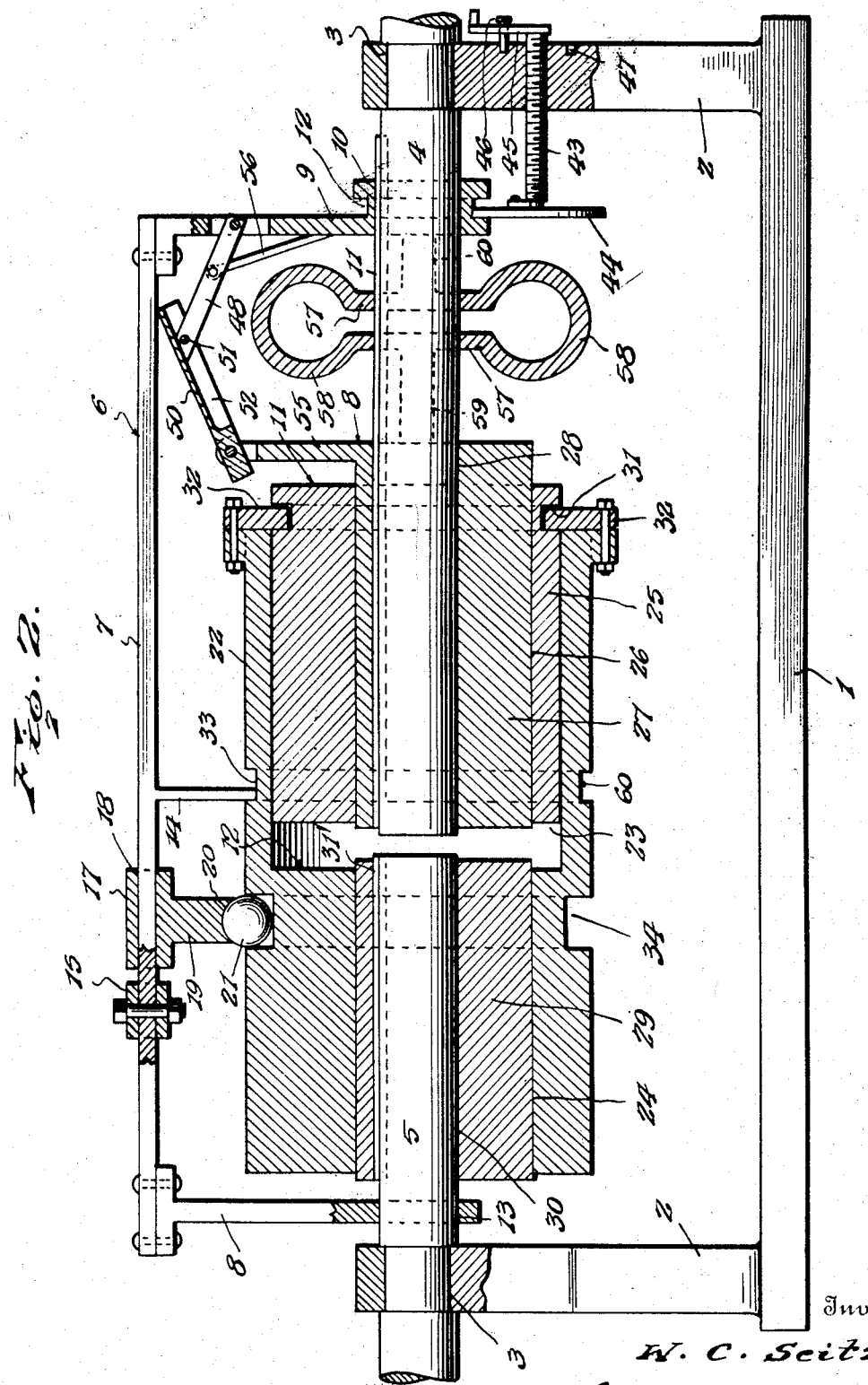
Figure 2 is a longitudinal sectional view through the device.

Referring to the drawings, the numeral 1 designates a base at the ends of which rise standards 2 having their upper ends provided with bearings 3. In one bearing is journaled a driving shaft 4, while in the other is journaled a driven shaft 5, said shafts having their opposed ends spaced and being disposed in direct axial alinement.

A frame 6 is provided and includes a horizontal bar 7 and end bars 8 and 9 carrying the bar 7, the bar 9 having a collar 10 at its lower or inner end slidably engaging the shaft 4 and held against rotation upon said shaft by the longitudinal key 11. This collar is provided with an annular groove 12, the purpose of which will appear later. The end bar 8 has a bearing 13 formed or provided at its inner or lower end in which rotatably engages the shaft 5. The bar 7 has an inwardly extending arm 14 between its ends and is further provided with an abutment 15 fixed thereto by a bolt 16, said abutment coacting with a head 17 slidable on the bar 7 for a purpose to be hereinafter described. The head 17 is provided with a bore 18, rectangular in cross section, for receiving the bar 7, and owing to the rectangular formation of the bore the head may slide but cannot rotate upon said bar. The head carries a stem 19 having a concave seat 20 formed therein for receiving the ball 21, the purpose of which will be later explained.

Used in connection with the shafts 4 and 5 is an outer cylindrical member 22 having formed therein an axial concentric chamber 23 which opens from one end. The member 22 is further provided with an eccentrically arranged longitudinally extending bore 24 which opens into the inner end of the chamber 23.

Mounted in the chamber 23 is a cylinder 25 in which is formed an eccentrically disposed bore 26 and engaged in said bore is a cylinder 27 having an eccentrically disposed bore 28 formed therein for engaging the shaft 4, said shaft being interlocked with the cylinder 27 by the key 11.

In the bore 24 is engaged a cylinder 29 having an eccentrically disposed bore 30 for receiving the shaft 5 which is interlocked in the bore by a key 31'.

The outer end of the cylinder 25 has an external annular groove 31 formed therein for receiving plates 32 which are bolted to the outer end of the member 22. These plates obviously retain the cylinder 25 against endwise movement in the chamber 23 in order that the desired clutching action between the cylinders 22 and 25 will be assured. The member 22 is also formed with an external annular groove 33 into which extends the arm 14.

Figure 7:
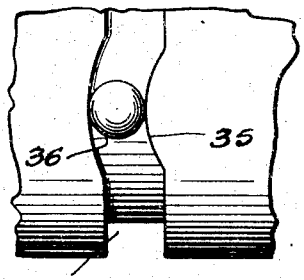
Figure 7 is a fragmentary view of the outer cylinder member, showing the cam surface.

A second external annular groove 34 is formed in the member 22 and in which the ball 21 travels, said groove having a cam face 35 formed upon one wall thereof, as more clearly shown in Figure 7 of the drawings, the opposite wall of the groove being correspondingly recessed, as at 36.

Figure 3:
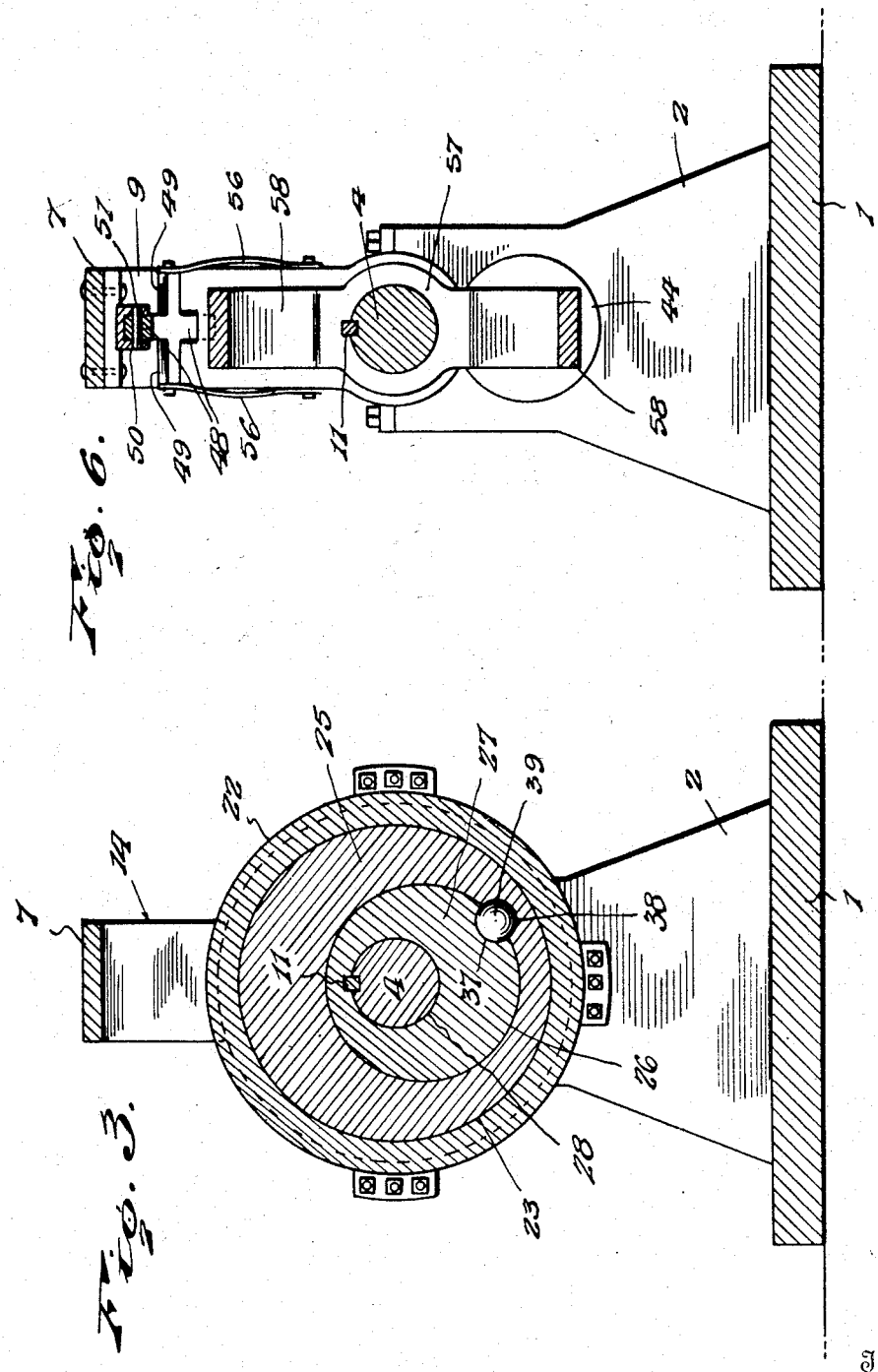
Fig. 3 is a sectional view on the line 3—3 of Figure 1.
Figure 4:
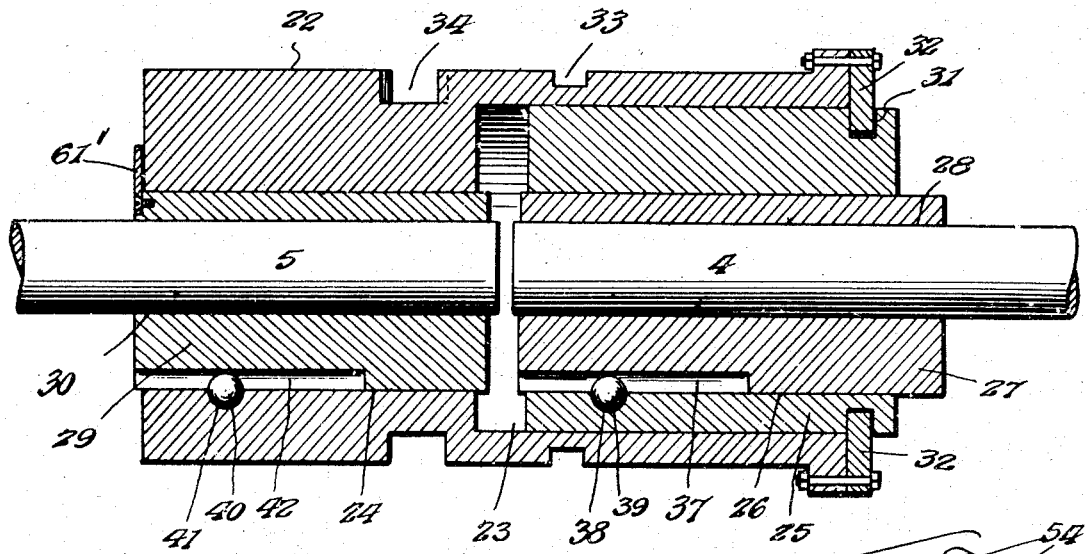
Figure 4 is a sectional view on the line 4—4 of Figure 1.
Figure 5:
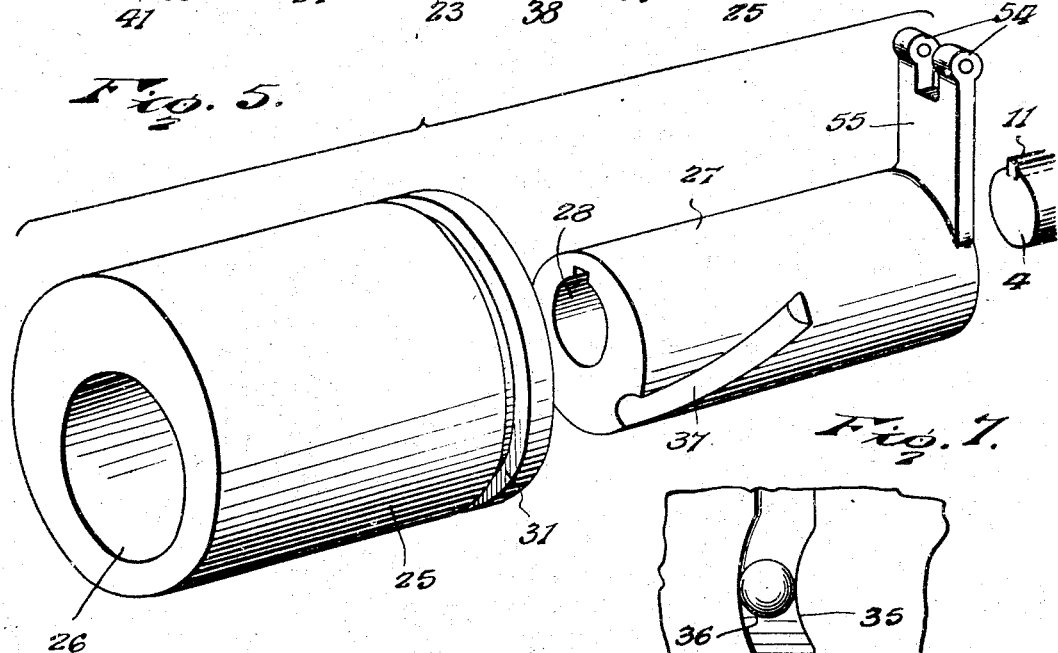
Figure 5 is a perspective view of a pair of the cylinders employed, in non-assembled relationship.

The eccentric cylinder 27 has a groove 37 in its outer circumference which extends obliquely, there being a recess 38 forced within the bore 26 of the cylinder 25 in which is seated a ball 39 which is also engaged in the groove 37, as shown in Figures 3 and 4, the cylinders 25 and 27 being thereby interlocked.

Within the bore 24 of the cylindrical member 22, a ball 40 rests in a seat 41 and engages in a diagonal or oblique groove 42 in the eccentric cylinder 29, the seats 38 and 41 being on the same longitudinal line of the member 22 and the grooves 37 and 42 corresponding to each other in all essential respects.

Adjustable in the standard 2 adjacent the collar 10 is a jack screw 43 having a disk 44 swiveled upon its inner end, said disk being engaged in the groove 12 of said collar. The jack screw has a crank handle 45 upon its outer end and in said handle is threaded a bolt 46 for selectively engaging the circularly arranged seats 47 formed in the adjacent standard.

The end bar 9 has pivotally connected thereto the outer end of the link 48 upon which are lateral lugs 49, the inner end of the link being pivotally connected to a second link 50, as at 51. The link 50 has a channel 52 formed therein so that when the links are moved from angular relationship upon shifting the frame 6, they will be held in horizontal alinement. The link 50 has its inner end pivotally connected to a pin 53 carried by the ear 54 formed upon the upper end of a plate 55, said plate being formed integral with the outer end of the eccentric cylinder 27.

Resilient arms 56 are pivoted to and connect the bar 9 and the lugs 49, said arms serving to break the joint between the links 48 and 50 when the frame is shifted toward the left.

Keyed on the shaft 4 between the collar 10 and the cylinder 27, are rings 57, said rings being resiliently connected by loops 58. The rings are provided with extensions 59 and 60 which have their terminals abutting the cylinder 27 and collar 10, respectively. By providing the loops 58, an efficient spring element is provided for disposition between the cylinder 27 and collar 10.

The shaft 4 may be driven from any suitable motor and the shaft 5 can be equipped with suitable pulleys for driving machinery when the clutch is in its operative position.

Figure 8:
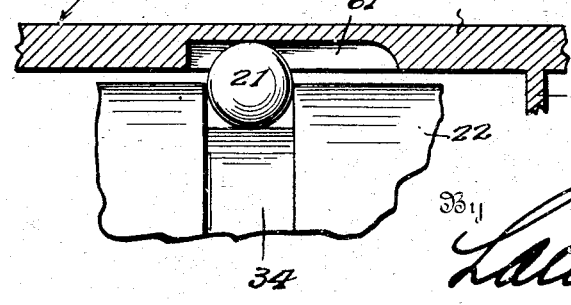
Figure 8 is a detail view, partly in section, showing a modified form of ball shifting mechanism.

In Figure 8 of the drawings, is illustrated a slight modification of the bar 7 of the frame 6 in which the head 17 is eliminated and the bar formed with a longitudinal groove 61 for engaging the ball 21.

Since the collar 10 is keyed to the shaft 4, rotation of the shaft will compel the frame 6 to rotate around the member 22 and when the clutch is in its inoperative position, the abutment 15 will be positioned to permit relative sliding movement between the head 17 and the bar 7 in order that the ball 21 will not be arrested or held against movement by the cam 35.

Briefly, the operation is as follows:

In assembling the parts, the eccentric bore 26 of the cylinder 25 is arranged in exact axial alinement with the eccentric bore 24 of the cylinder 22 and the eccentrics 27 and 29 will, consequently, occupy the same relation to the respective shafts 4 and 5. When the high part of the eccentric 27 is presented to the low part of the eccentric 25, as shown in Figure 3, the outer circumference of the eccentric 25 will be concentric with the inner circumference of the cylinder 22 and motion will not be transmitted to said cylinder 22, but if the eccentrics 25 and 27 or either of them be shifted toward a position in which their high parts are together, they will exert a binding or clamping action between the shaft 4 and the cylinder 22 so that the rotation of the shaft will be transmitted to the cylinder. Likewise, if the high part of the eccentric 29 be disposed upon the longest line extending radially of the shaft 5 across the bore 24, the cylinder 22 will be free of the shaft 5 but if the eccentric be shifted so that its high part will be disposed upon a shorter radial line extending from the shaft across the bore it will act as a clamp to bind the cylinder to said shaft so that rotation of the cylinder will be transmitted to the shaft.

The driving shaft 4 may rotate continuously and the eccentrics are normally so positioned that the cylinder 22 will be free of the shafts. The frame 6 will, of course, rotate with the driving shaft 4 but normally there is relative sliding movement between said bar and the head 17 so that as the ball 21 travels around the groove 34 the head may reciprocate the length of a stroke corresponding to the height of the cam 35, the arm 14 riding along one wall of the groove 33 to resist endwise movement of the cylinder 22. When it is desired to close the clutch, the jack screw 43 is rotated so as to move to the right in Figure 1, thereby shifting the disk 44 relative to the collar 10, the springs 58 immediately expanding and causing the collar to follow the disk, and the frame with its top bar 6 will, of course, move with the collar. This shifting of the frame will aline the links 48 and 50, as described, so that the eccentric 27 will be held against endwise movement and will also bring the abutment 15 against the head 17 so that the head will be held against reciprocation by the abutment and the engagement of the ball 21 in the groove 34, the arm 14 being shifted to the right so that it will not resist endwise movement of the cylinder 22. Consequently, when the ball 21 now meets the cam 35, the cylinder will be shifted to the right. As the retainer plates 32 prevent relative endwise movement between the cylinder and the eccentric 25, the latter must shift with the cylinder and in so shifting it carries the ball 39 with it. The ball is thus caused to ride against the wall of the diagonal groove 37 in the eccentric 27, a cam action being thereby set up which rotates the eccentric 25 sufficiently to effect a binding engagement with the cam 27 and the cylinder so that the cylinder will be locked to the driving shaft and will rotate therewith. When the cylinder 22 is shifted endwise as just described, it carries the ball 40 along and said ball engages the wall of the groove 42 with a cam action exactly as the ball 39 engages the groove 37 and the eccentric 29 is, consequently, turned to lock the cylinder to the driven shaft 5, and the power of the driving shaft will be transmitted through the cylinder to the driven shaft until the jack screw is manipulated to shift the collar 10 to the left against the force of the springs 58. A stop lug 61' is carried by the cylinder 29 and abuts the adjacent end of the cylinder 22.

What is claimed is:

1. A clutch comprising a driving shaft and a driven shaft, an outer cylindrical member, eccentrics in said member keyed to the respective shafts, a frame rotatably interlocked with the driving shaft for movement around said cylindrical member, means carried by the frame for interlocking engagement with the cylindrical member upon shifting of the frame in one direction to shift said member endwise, and means whereby shifting of said cylindrical member will lock the eccentrics thereto for transmitting motion from the driving shaft to the driven shaft.

2. A clutch comprising a driving shaft and a driven shaft, an outer cylindrical member, eccentrics mounted in the member and keyed to the respective shafts, means for interlocking the eccentrics with the cylindrical member, a frame slidably keyed to the driving shaft for movement around the cylindrical member, and interlocking means between said member and frame to shift the member and the eccentrics to cause the shafts to rotate simultaneously.

3. A clutch comprising a driving shaft and a driven shaft, an outer cylindrical member having an annular groove formed therein and provided with a cam in said groove, eccentrics mounted in said member and keyed to the respective shafts, a frame rotatable with the driving shaft and rotatable around the cylindrical member when the clutch is inactive, a head slidably associated with the frame, a ball rotatably engaged with the head and engaged in said groove in the cylindrical member for interlocking the frame and cylindrical member when the frame is shifted in one direction, means carried by said member for engaging the eccentrics upon shifting the frame to cause the shafts to simultaneously rotate.

4. A clutch comprising alined driving and driven shafts, eccentrics keyed to the respective shafts, a cylindrical member confining said eccentrics, a frame interlocked with the driving shaft for movement around the cylindrical member when the clutch is inoperative, means whereby said member may be shifted when the frame is shifted, means for shifting the frame, and means controlled by the cylindrical member for coupling the shafts through the eccentrics when the frame is shifted.

5. A clutch comprising a driving shaft and a driven shaft, an outer cylindrical member, eccentrics in said member keyed to said shafts, a frame rotatable around the member when the clutch is inoperative, means carried by the frame for interlocking the frame and said member, and means for coupling the eccentrics with the member to cause the driving shaft to rotate the driven shaft.

6. A clutch comprising a driving shaft and a driven shaft disposed in alinement, eccentrics keyed upon the respective shafts, a cylindrical member confining the eccentrics, a frame driven by the driving shaft and movable about the member when the clutch is inoperative, means carried by the frame for interlocking the frame and cylindrical member to shift said member, and means interengaged with said member and eccentrics to shift the eccentrics with respect to the centers of the shafts to drive the cylindrical member, and the driven shaft.

7. A clutch comprising alined driving and driven shafts, a cylindrical member, eccentrics keyed upon the respective shafts and confined within said member, a frame driven by the driving shaft for movement about the cylindrical member when the clutch is inactive, means carried by the frame for interlocking the frame and said member when the frame is shifted in one direction, means for interlocking the eccentrics and cylindrical member for transmitting motion from the driving shaft to the driven shaft, and means for shifting the frame.

8. A clutch comprising alined driving and driven shafts, a cylindrical member encircling the opposed ends of the shafts, a frame secured to the driving shaft and extending along the cylindrical member, said member having an external annular cam groove, a shifting element slidably mounted on the frame and engaged in said groove in the cylindrical member, an abutment on the frame normally out of contact with said shifting element, means on the frame normally resisting endwise movement of the cylindrical member, means for shifting the frame whereby said last-mentioned means will release the cylindrical member and the abutment will be engaged with said shifting element to effect endwise shifting of the cylindrical member, and means whereby endwise movement of the cylindrical member will cause it to be locked to the driving and driven shafts.

9. A clutch comprising a driving shaft, a driven shaft alined therewith, eccentrics keyed upon the respective shafts and arranged in alinement, a frame keyed upon the driving shaft, a toggle connection between said frame and the eccentric on the driving shaft, a cylindrical member encircling the eccentrics, an intermediate eccentric within the cylindrical member and between the same and the eccentric keyed to the driving shaft, means for preventing endwise movement of the intermediate eccentric relative to the cylindrical member, interengaging means between the intermediate eccentric and the eccentric keyed to the driving shaft, interengaging means between the cylindrical member and the eccentric keyed to the driven shaft, normally inactive interengaging means between the frame and the cylindrical member, means for rendering the last-mentioned means active upon shifting the frame in one direction, and means for shifting the frame whereby the eccentrics will lock the cylindrical member to the driving and the driven shafts.

In testimony whereof I affix my signature.

WILLIAM C. SEITZ. [L. S.]